United States Patent
Eckstein et al.

(10) Patent No.: US 8,836,545 B2
(45) Date of Patent: Sep. 16, 2014

(54) MOTOR VEHICLE

(75) Inventors: Lutz Eckstein, Aachen (DE); Josef Schumann, Munich (DE); Martin Zobl, Kaufering (DE); Christian Knoll, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 610 days.

(21) Appl. No.: 13/106,535

(22) Filed: May 12, 2011

(65) Prior Publication Data

US 2011/0241906 A1 Oct. 6, 2011

Related U.S. Application Data

(63) Continuation of application No. PCT/EP2009/007494, filed on Oct. 20, 2009.

(30) Foreign Application Priority Data

Nov. 13, 2008 (DE) .................... 10 2008 056 973

(51) Int. Cl.
*G08G 1/123* (2006.01)
*B60K 35/00* (2006.01)
*B60K 37/06* (2006.01)

(52) U.S. Cl.
CPC .......... *B60K 35/00* (2013.01); *B60K 2350/108* (2013.01); *B60K 37/06* (2013.01)
USPC ............ 340/995.1; 701/1; 248/27.1; 318/580

(58) Field of Classification Search
USPC .......... 340/995.1, 995.11–995.17; 701/1, 36; 248/27.1; 318/580, 587
See application file for complete search history.

(56) References Cited

U.S. PATENT DOCUMENTS

| 6,452,570 B1 | 9/2002 | Kuenzner |
| 2002/0082752 A1* | 6/2002 | Obradovich ................. 701/1 |

(Continued)

FOREIGN PATENT DOCUMENTS

| DE | 198 37 510 A1 | 2/2000 |
| DE | 199 41 962 A1 | 3/2001 |

(Continued)

OTHER PUBLICATIONS

English-language translation of the International Preliminary Report on Patentability and Written Opinion (Eight (8) pages).

(Continued)

*Primary Examiner* — George Bugg
*Assistant Examiner* — Edny Labbees
(74) *Attorney, Agent, or Firm* — Crowell & Moring LLP (57) ABSTRACT

A motor vehicle includes a plurality of electronic detection devices for detecting and making available vehicle-related information items, wherein the vehicle-related information items relate to various areas or components outside or inside the motor vehicle; a display unit for displaying the vehicle-related information items; an operator control device for detecting an operator control action; and a control unit. The control unit is configured and coupled with the detection devices, the display unit and the operator control device such that in a first display operating state, first vehicle-related information items and a first graphics object, which represents the motor vehicle, are displayed. In a second display operating state, second vehicle-related information items and a second graphics object, which represents the motor vehicle, are displayed. The first graphics object, which represents the motor vehicle, is larger than the second. Switching between the first and the second display operating states is brought about by way of an operator control action.

13 Claims, 5 Drawing Sheets

(56) References Cited

U.S. PATENT DOCUMENTS

| | | | |
|---|---|---|---|
| 2002/0198635 A1* | 12/2002 | Obradovich et al. | 701/1 |
| 2005/0168330 A1 | 8/2005 | Ono et al. | |
| 2008/0094313 A1* | 4/2008 | Simon et al. | 345/7 |
| 2008/0161997 A1 | 7/2008 | Wengelnik et al. | |
| 2012/0158243 A1* | 6/2012 | Pupin et al. | 701/36 |

FOREIGN PATENT DOCUMENTS

| | | |
|---|---|---|
| DE | 101 17 030 C2 | 3/2003 |
| DE | 103 92 383 T5 | 4/2005 |
| DE | 10 2006 002 679 A1 | 8/2007 |
| DE | 10 2007 014 530 A1 | 10/2008 |
| EP | 1 300 278 A2 | 4/2003 |
| EP | 0 893 750 B1 | 9/2003 |
| WO | WO 2006/108617 A2 | 10/2006 |
| WO | WO 2006/114111 A1 | 11/2006 |

OTHER PUBLICATIONS

International Search Report dated Jan. 25, 2010 with English translation (six (6) pages).

German Search Report dated Feb. 18, 2009 with partial English translation (nine (9) pages).

* cited by examiner

MOTOR VEHICLE

CROSS-REFERENCE TO RELATED APPLICATIONS

This application is a continuation of PCT International Application No. PCT/EP2009/007494, filed Oct. 20, 2009, which claims priority under 35 U.S.C. §119 from German Patent Application No. DE 10 2008 056 973.9, filed Nov. 13, 2008, the entire disclosures of which are herein expressly incorporated by reference.

This application contains subject matter related to U.S. application Ser. No. 13/106,604, entitled "Motor Vehicle Operating System," filed on even date herewith.

BACKGROUND AND SUMMARY OF THE INVENTION

The invention relates to a vehicle having a plurality of electronic detection devices.

Current motor vehicles have increasingly an operator control unit, which is formed separately by a display unit, in the area of the center console. Such an operator control unit is known, for example, from EP 0893750 B1. In this case, the operator control unit has a switching element which can be rotated bidirectionally about an axis of symmetry and, therefore, is mounted so as to be axially moveable (pressable) and swivellable. Hence, by rotating, pressing and/or swivelling the switching element it is possible, for example, to mark and select menu points on a display unit or to adjust parameters.

Similarly, it is known to adjust the zoom factor, in particular the display scale, of a road map display of a motor vehicle navigation system by rotating such an operator control unit. The term "zoom" also includes the term "display scale change" within the scope of the invention.

Moreover, there exist electronic detection devices for motor vehicles. They include, for example, a sensor device and a control or processing device, and are made available for detecting, monitoring or controlling vehicle components or areas inside and outside the motor vehicle.

Some examples are driver assistance systems, check control systems, near field detection systems, etc. For example, if such a system detects an error or a critical state, a control light is automatically activated, or another monitoring signal is sent.

In addition or as an alternative, it is known to give a user the possibility of accessing information, made available by a detection device, by way of an operator control element, for example, a push button. Such access to driver assistance information, check control information and/or information relating to the surroundings can also take place by selecting a menu point by means of an aforementioned operator control unit.

In particular, the manual access to vehicle-related information that is made available by the detection devices is usually complicated and is not designed so as to be intuitive. Moreover, in the past the various vehicle-related information items, such as information items of the navigation system, information items of the driver assistance system and the check control information items, were accessed in non-uniform ways, in particular, by means of different operator control elements and display units.

Working on the basis of the aforesaid, the object of the invention is to provide an improved motor vehicle.

This and other objects are achieved by a motor vehicle having a plurality of electronic detection devices for detecting and making available vehicle-related information items, wherein the vehicle-related information items relate to various areas or components outside or inside the motor vehicle. The motor vehicle includes a display unit for displaying the vehicle-related information items, an operator control device for detecting an operator control action, and a control unit. The control unit is configured and coupled with the detection devices, the display unit and the operator control device such that, in a first display operating state, the first vehicle-related information items and a first graphics object, which represents the motor vehicle, are displayed. In a second display operating state, the second vehicle-related information items and a second graphics object, which represents the motor vehicle, are displayed. The first graphics object, which represents the motor vehicle, is larger than the second, and switching between the first and the second display operating states is brought about by way of an operator control action.

A preferred motor vehicle has a plurality of electronic detection devices for detecting and making available vehicle-related information items, wherein the vehicle-related information items relate to various areas or components outside or inside the motor vehicle.

Some examples of detection devices include the following:

(1) Near field detection systems for making available information about the near surroundings (for example, the surroundings, which lie inside a circle about the center of the vehicle at a radius of 20 meters) of the motor vehicle. For example, information about impediments when parking or impediments when getting out of the vehicle are sent as vehicle-related information items.

(2) Tire monitoring system for making available information about the vehicle tires. For example, information about the air pressure of the tire or the remaining tread life of the tire are made available as the vehicle-related information items.

(3) Operating substance monitoring systems for making available information about the fill level of the operating substance containers. For example, information about the fill level of the washing fluid container, the motor oil container, the brake fluid container, etc. is made available as the vehicle-related information items.

(4) Systems for monitoring the degree of wear and making available information about the degree of abrasive wear of vehicle components. For example, information about the degree of wear of the vehicle brake components, etc. is made available as vehicle-related information items.

The vehicle-related information items can be displayed on a display unit. An operator control action can be detected by use of an operator control device. A control unit is configured and coupled with the detection devices, the display unit and the operator control device such that: in a first display operating state the first vehicle-related information items and a first graphics object (motor vehicle-graphics object), which represents the motor vehicle, are displayed (for example, a simplified top view display of a motor vehicle); in a second display operating state the second vehicle-related information items and a second graphics object, which represents the motor vehicle, are displayed; the first graphics object, which represents the motor vehicle, is larger than the second, especially with respect to the display size; and switching between the first and the second display operating states is brought about by means of an especially predefined operator control action.

As a result, a number of different detection devices are coupled with the motor vehicle-graphics objects of various size. This approach enables a more appropriate display, based on the motor vehicle-graphics object, of the vehicle-related information items. In addition, a "zooming" of the graphics object is combined with an intuitive switching between the detection devices and the associated vehicle-related information items. Thus, the zoom effect of the user's operator control action that the user can recognize by the different sizes of the motor vehicle-graphics objects is coupled with a "zooming" through the vehicle-related information items. Hence, the result of switching between the detection devices or the vehicle-related information items is an intuitive "zooming" through various detection devices or vehicle-related information items. This approach simplifies the targeted manual access to specific vehicle-related information items from a large amount of vehicle-related information items and, at the same time, makes this access fast, reliable and intuitive.

Preferably the second vehicle-related information items relate to an area or a component outside or inside the motor vehicle that is at a greater distance from the center of the motor vehicle than the area or the component, to which the first vehicle-related information items relate. This correlation does not have to be implemented seamlessly or invariably without exceptions.

Consequently, components or areas that are further away are coupled with the smaller graphics object, representing the motor vehicle, and vice versa. A graphics object that gets smaller communicates to the user that those vehicle-related information items are now being displayed that relate to components or areas that are further away. A graphics object that gets larger communicates to the user that those vehicle-related information items are now being displayed that relate to components or areas that are arranged closer to the center of the vehicle.

Preferably in an additional, in particular a third, display operating state, for example, a zoom operating state, a navigation operating state or a road map display state, the predefined operator control action changes the display scale of a road map display. The road map display can be made available by means of a well-known navigation system.

Thus, in this additional display operating state a well-known operator control action, in particular a zoom operator control action, produces a well-known zoom effect, which relates to a road map display. This same operator control action, in particular the zoom operator control action, brings about a switch-over, as described above, between different detection devices or vehicle-related information items. This feature reinforces even more the transfer of the zoom idea to the switching between different detection devices or vehicle-related information items. This approach simplifies even more the targeted manual access to desired vehicle-related information items.

Preferably, in the second display operating state, the operator control action brings about a switch-over into a zoom operating state, in that the display unit displays a road map display; and in that the display scale of the road map display is changed by means of an additional operator control action.

In the first and the second display operating states, the road map display is preferably not displayed by the display unit.

The aforesaid makes it possible to switch by way of consecutive operator control actions—in particular, zoom operator control actions—from a first display operating state (display of vehicle-related information items that relate to a component or an area close to the center of the vehicle; large display of the motor vehicle-graphics object), first of all, into a second display operating state (display of vehicle-related information items that relate to a component or an area that is arranged farther away from the center of the vehicle than the component or the area of the first display operating state; smaller display of the motor vehicle-graphics object), and then to switch into a third display operating state, in particular, a zoom operating state, in that the display unit shows a road map display, and in that the display scale of the road map display is changed by way of an additional operator control action, in particular a zoom operator control action. Preferably, the third operating state shows a motor vehicle-graphics object, which advantageously, especially with respect to the display size, is even smaller than the motor vehicle-graphics object, assigned to the second display operating state.

In this way the zoom concept, known from a road map display, is transferred and expanded to include a motor vehicle-graphics object display, wherein the zooming through the motor vehicle-graphics object display is linked to the display of various vehicle-related information items. In this case the zoom idea is transferred to the display of various vehicle-related information items, since as the display of the motor vehicle-graphics object is enlarged, little-by-little different vehicle-related information items are displayed that relate to various components or areas.

The larger the display of the motor vehicle-graphics object, the closer the component or the area, which is described by the vehicle-related information items, is to the center of the motor vehicle.

Preferably, the first and the second (and optionally the third) graphics objects representing the motor vehicle are in essence identical in terms of shape, contour, and/or the display position on the display unit. This feature communicates the zoom idea even better to a user.

Preferably, those areas or components, to which the displayed vehicle-related information items relate, are displayed on the display unit in such a way that corresponding component-graphics objects or area-graphics objects are marked, especially highlighted or displayed in detail, on the display unit. The location of the component-graphics objects or the area-graphics objects relative to the motor vehicle-graphics object corresponds to the location of the components or areas relative to the center of the motor vehicle.

One operator control action or the operator control actions, in particular the zoom operator control action, comprises preferably a rotation of a rotary element about a predefined angle of rotation, in particular a predefined direction of rotation.

The scope of the invention also includes a motor vehicle comprising a plurality of electronic detection devices for detecting and making available vehicle-related information, wherein the vehicle-related information relates to various areas or components outside or inside the motor vehicle. The motor vehicle includes a display unit for displaying vehicle-related information items and a graphics object, which represents the motor vehicle, an operator control device for detecting an operator control action, and a control unit. The control unit is configured and coupled to the detection devices, the display unit and the operator control device such that consecutive identical operator control actions allow the user to page through a variety of vehicle-related information items (are displayed one after the other on the display unit), wherein the paging through the various vehicle-related information items is coupled to a change in the display scale of a graphics object, which represents the motor vehicle and is displayed on the display unit. Preferably, it is also within the scope of the invention that the inventive coupling of the paging and the change in the display scale is implemented only partially, for example, with respect to a part of the vehicle-related information items that are displayed.

Preferably, the paging through the various vehicle-related information items is coupled with a consecutive marking of component-graphics objects or area-graphics objects on the display unit, wherein the component-graphics objects or the area-graphics objects relate to the components or the areas, to which the displayed vehicle-related information items relate.

It is a further development of the invention that the location of the component-graphics objects or the area-graphics objects relative to the graphics object, representing the motor vehicle, corresponds to the location of the components or areas relative to the center of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

The starting point is a well-known motor vehicle. Those components of the motor vehicle that are necessary to understand the invention are shown in FIG. 1 and include the following:

A plurality of electronic detection devices US are provided for detecting and making available vehicle-related information, wherein the vehicle-related information relates to various areas or components outside or inside the motor vehicle. A display unit ANZ, such as a display or a display section, is provided for displaying vehicle-related information items. A navigation system NAV is provided for making available a road map display. An operator control device BE, for example in the form of a rotary/push element, is provided for detecting an operator control action. And, one or more control units STE, are provided which are coupled to the detection devices US, the display unit ANZ, the navigation system NAV, and the operator control device BE.

In particular, the control unit STE is now configured, according to an exemplary embodiment of the invention, in such a way that in a first display operating state first vehicle-related information items and a first graphics object, which represents the motor vehicle, are displayed; and in a second display operating state, second vehicle-related information items and a second graphics object, which represents the motor vehicle, are displayed. The first graphics object, which represents the motor vehicle, is displayed so as to be larger than the second; and switching between the first and the second display operating states is brought about by way of an operator control action.

Figure 1:
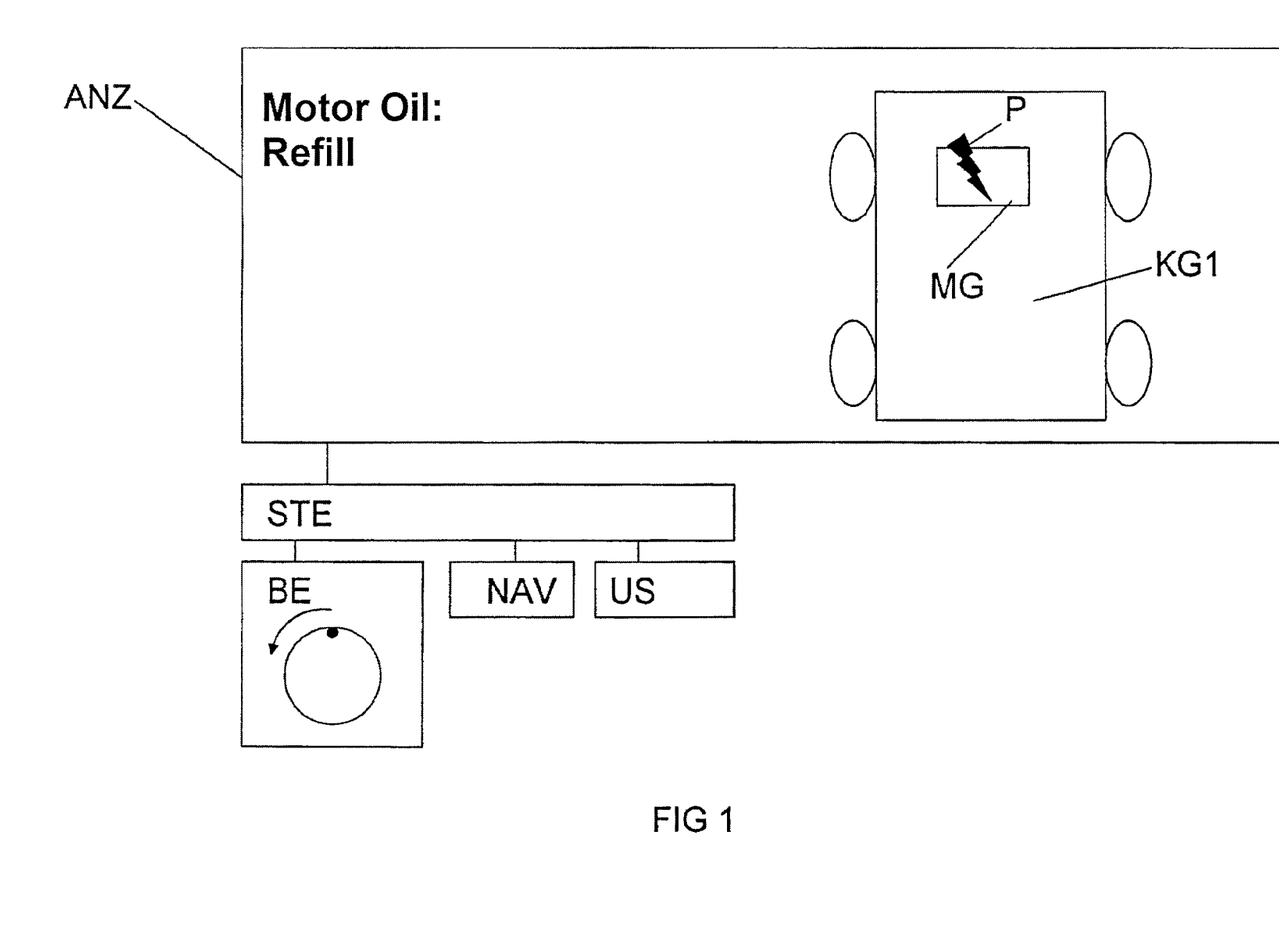
FIG. 1 is a simplified block diagram of a motor vehicle system showing a display operating state.

In FIG. 1 the system—comprising the so-called components—is in a first display operating state. The motor vehicle-graphics object KG1 is displayed relatively large. The information "motor oil: refill" is displayed as the first vehicle-related information item.

In this example the component, to which the depicted vehicle-related information items relate, is the motor oil container. The corresponding component-graphics object, in this case the motor oil container-graphics object MG, is displayed so as to be marked by the arrow P and, as a result, is displayed in a highlighted manner.

The location of the motor oil container-graphics object MG relative to the graphics object KG1, representing the motor vehicle, corresponds to the location of the motor oil container relative to the center of the motor vehicle.

Figure 2:
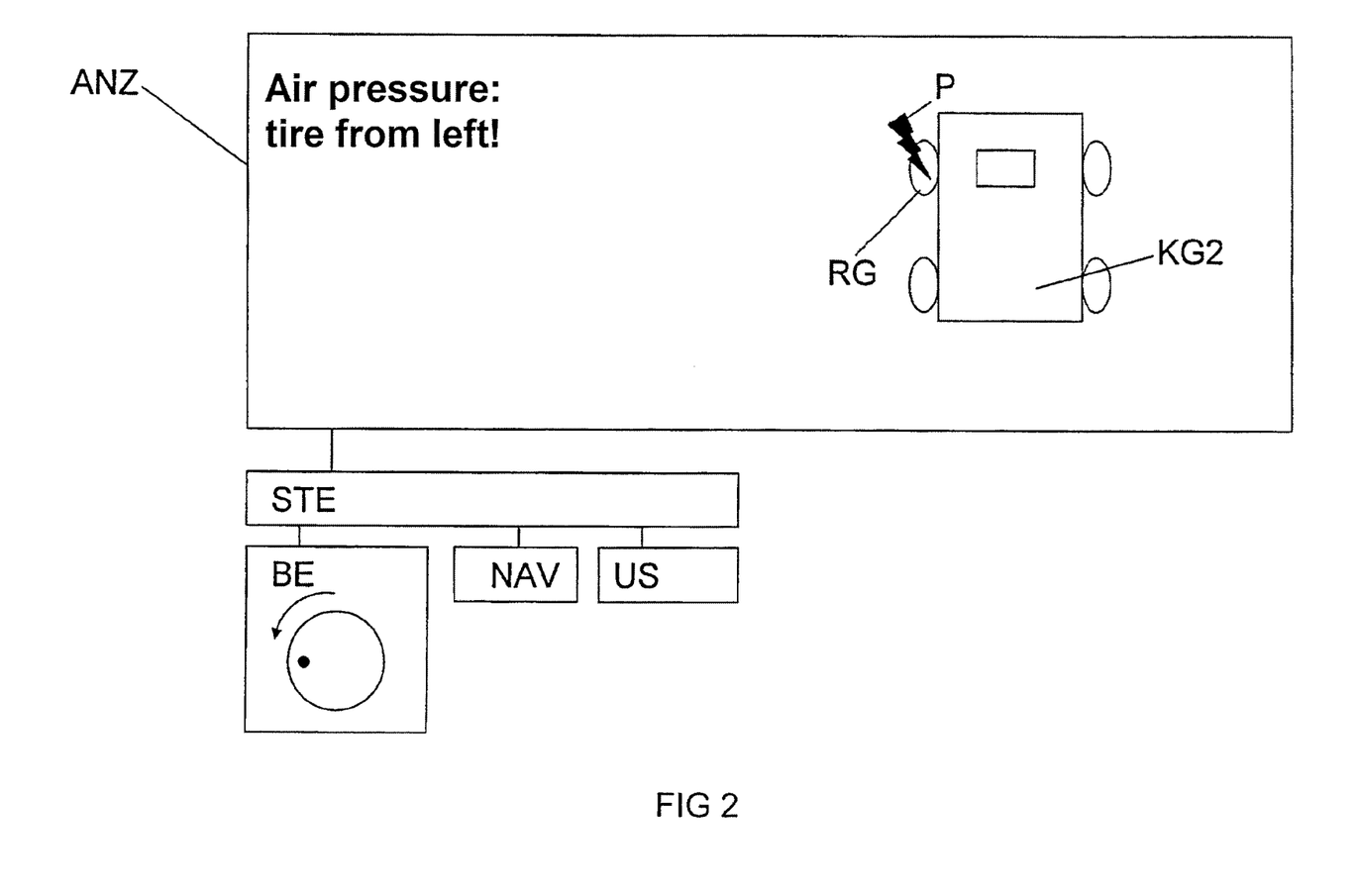
FIG. 2 is a simplified block diagram of a motor vehicle system showing a display operating state.

If at this point the rotary element BE in the first display operating state is rotated, as seen in FIG. 2, about a 90 degree angle of rotation counterclockwise, then this operator control action brings about a switch-over from the first display operating state to the second display operating state.

At this point the second motor vehicle-graphics object KG2 is depicted a step smaller. The information "air pressure: front left tire!" is displayed as the second vehicle-related information item.

In this example the component, to which the depicted vehicle-related information item relates, is the front left tire. The corresponding component-graphics object, in this case the tire-graphics object RG at the top left, is displayed so as to be marked by the arrow P and, as a result, is displayed in a highlighted manner.

The location of the tire-graphics object RG relative to the graphics object KG2, representing the motor vehicle, corresponds to the location of the front left tire relative to the center of the motor vehicle.

The second vehicle-related information item (tire pressure) relates to a component (tire) that is at a greater distance from the center of the motor vehicle than the component (motor oil level), to which the first vehicle-related information item (motor oil fill level) relates.

The first and the second graphics objects KG1, KG2 representing the motor vehicle are in essence identical in terms of shape, contour and the display position on the display unit.

At this point, the invention is explained by means of an additional example. This example assumes that the past "second display operating state" is a "first display operating state".

Figure 3:
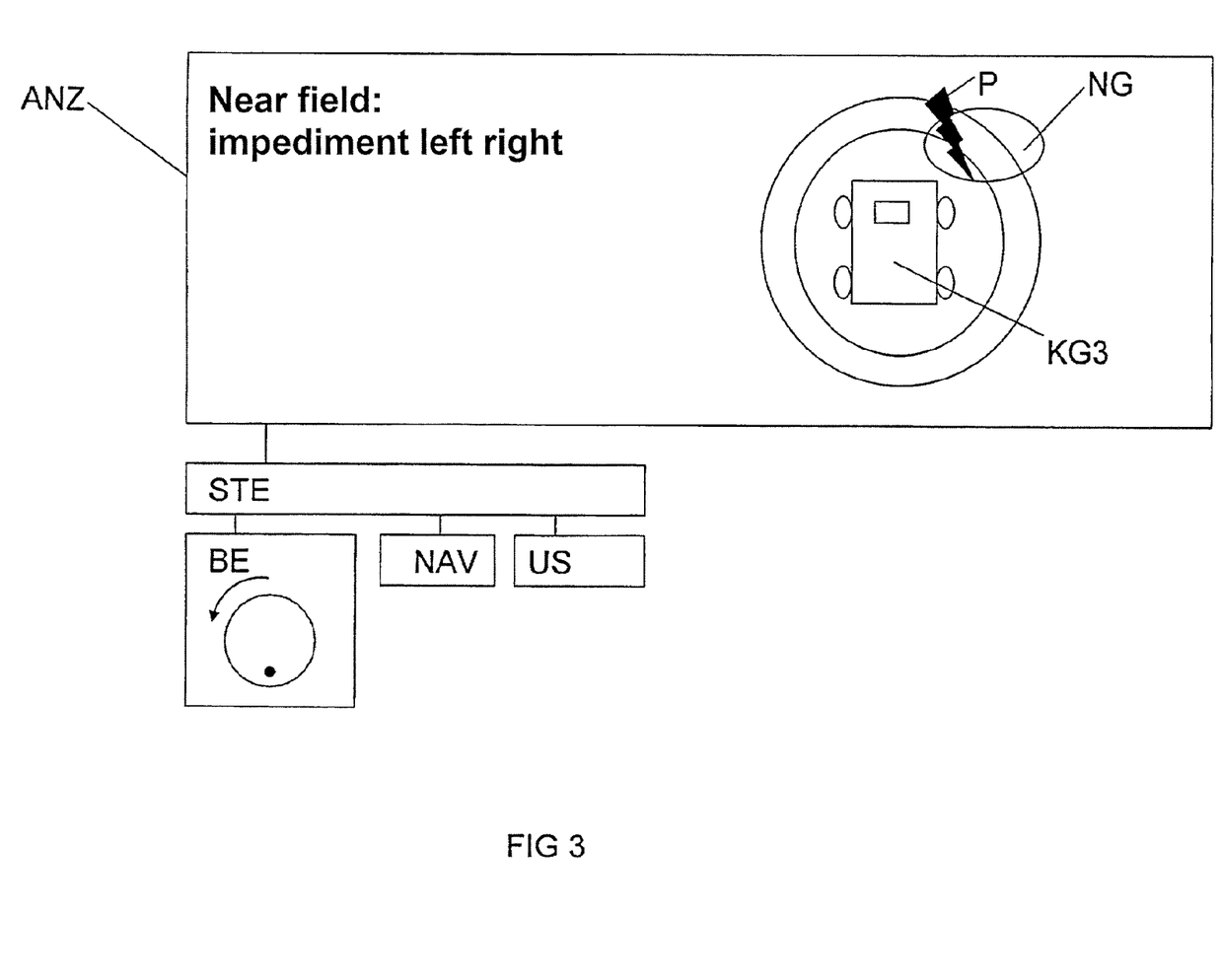
FIG. 3 is a simplified block diagram of a motor vehicle system showing a display operating state.

If now in this new first display operating state the rotary element BE is rotated, as seen in FIG. 3, about a 90 degree angle of rotation counterclockwise, then this operator control action brings about a switch-over from the new first display operating state to a new second display operating state.

At this point the second motor vehicle-graphics object KG3 is depicted even a step smaller. The information "near field: impediment front right" is displayed as the second vehicle-related information item.

In this example the area, to which the depicted vehicle-related information items relate, is the near field area at the front right. The corresponding area-graphics object—in this case the near field-graphics object NG—is displayed so as to be marked by the arrow P and, as a result, is displayed in a highlighted manner.

The location of the near field-graphics object NG relative to the graphics object KG3, representing the motor vehicle, corresponds to the location of the respective near field relative to the center of the motor vehicle.

The second vehicle-related information item (impediment in the near field) relate to an area (near field) that is at a greater distance from the center of the motor vehicle than the component (tire), to which the first vehicle-related information item (tire pressure) relates.

Figure 4:
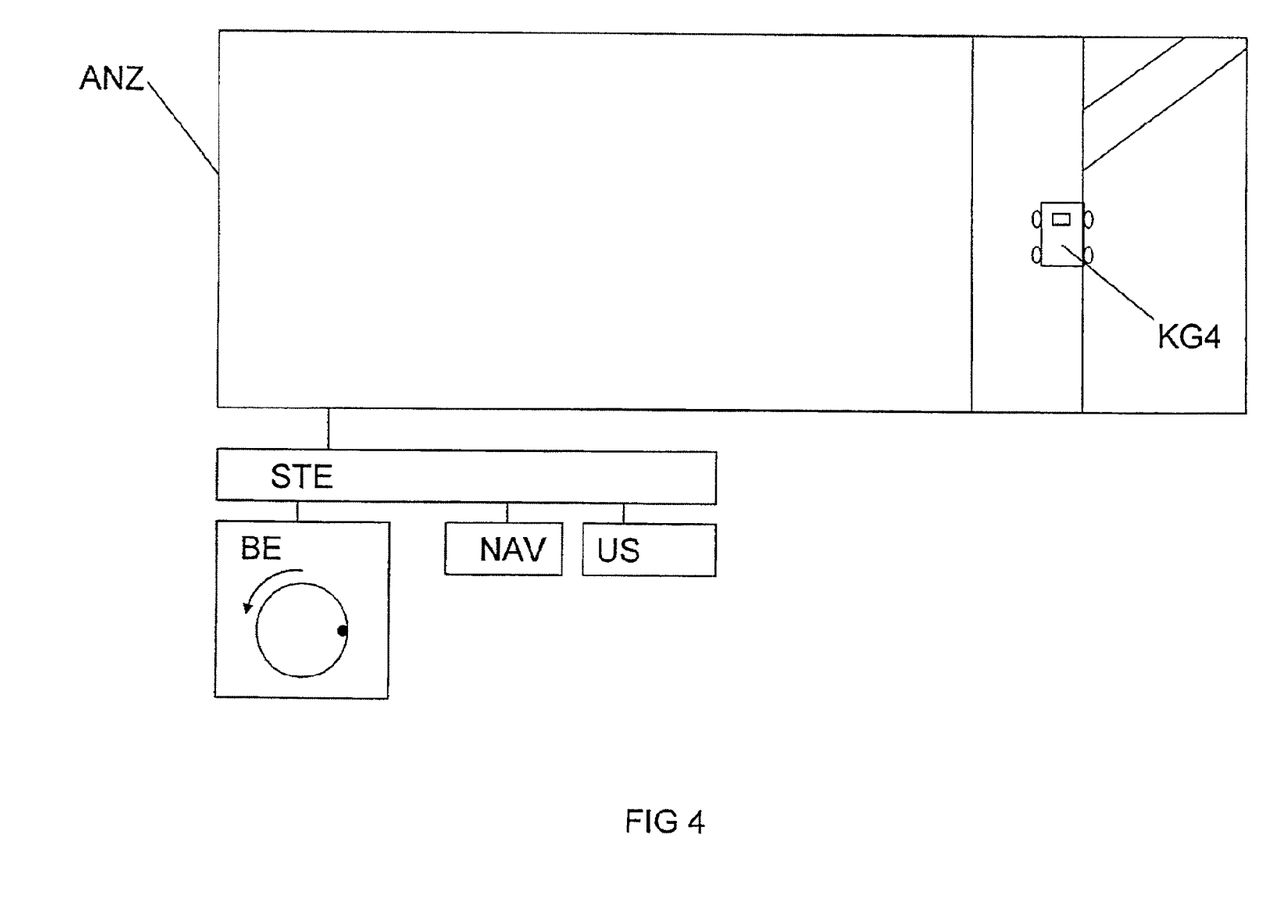
FIG. 4 is a simplified block diagram of a motor vehicle system showing a display operating state.

If now, in an additional or the second display operating state, the rotary element BE is rotated, as seen in FIG. 4, about a 90 degree angle of rotation counterclockwise, then this operator control action brings about a switch-over from the additional or second display operating state to an additional display operating state, a so-called zoom operating state, in which the display unit displays a road map display.

Figure 5:
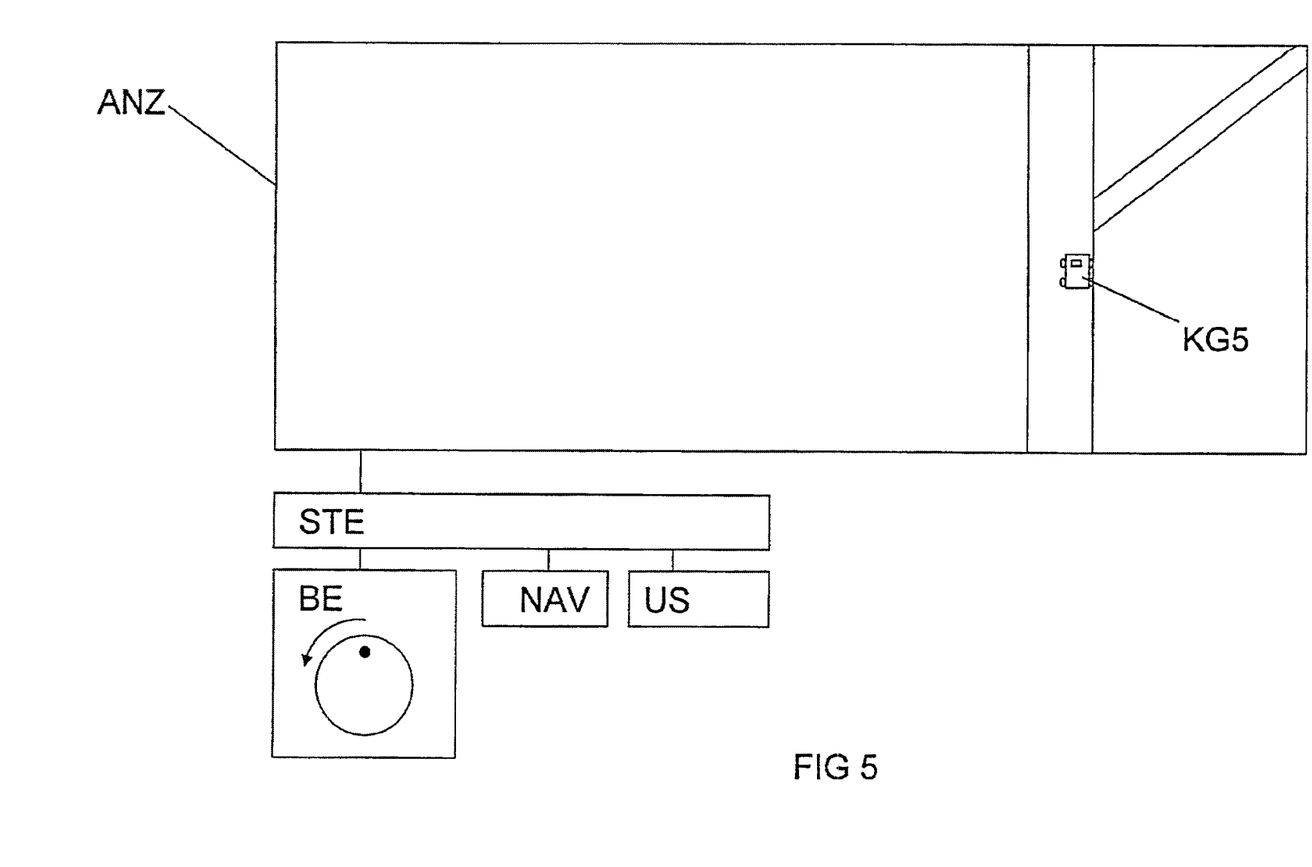
FIG. 5 is a simplified block diagram of a motor vehicle system showing a display operating state.

In the zoom operating state the display scale of the road map display is changed, as seen in FIG. 5, by means of an additional rotation of the rotary element BE about a 90 degree angle of rotation counterclockwise (zoom operator control action).

In the zoom operating state, the zoom factor for the display of the road map information items, in particular between two limit values, can be adjusted by means of additional predefined zoom operator control actions.

In at least one predefined operator control situation or zoom situation, in particular when adjusting the zoom factor to a limit value, an additional zoom operator control action (rotating the rotary element by 90 degrees clockwise) brings about a switch-over from the zoom operating state back again into the additional or second display operating state.

FIGS. 4 and 5 show the road map display in the zoom operating state according to different display scales and/or zoom factors. In FIG. 4 the road map display and the corresponding motor vehicle-graphics object KG4 are depicted so as to be larger than the road map display and the corresponding motor vehicle-graphics object KG5 in FIG. 5.

Therefore, if one starts from the first display operating state, explained with reference to FIG. 1, consecutive zoom operator control actions (rotating the rotary element by 90 deg. counterclockwise) bring about a "zooming away" from the vehicle center, beginning with the display of the motor oil level up to as far as an extremely minimized display of a road map. This "zooming" is communicated to the user as a constantly diminishing display of a motor vehicle-graphics object.

Working on this basis, consecutive identical operator control actions allow the user to page through various vehicle-related information items. In this respect the paging through various vehicle-related information items is coupled with a change in the display scale of a graphics object, which represents the motor vehicle and is displayed on the display unit.

Starting from the display operating state, described with reference to FIG. 5, it is possible to switch gradually again into the display operating state, according to FIG. 4, the display operating state according to FIG. 3, the display operating state according to FIG. 2, and the display operating state according to FIG. 1 by means of consecutive rotations of the rotary element BE by 90 degrees clockwise.

As costly simulations show, the invention enables an intuitive, reliable, fast, simple and clear navigation through various vehicle-related information items.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a display unit for displaying vehicle-related information items associated with at least one of areas and components located at least one of outside and inside the motor vehicle;
   an operator control device for detecting an operator control action; and
   a control unit, the control unit being operatively coupled with the display unit and the operator control device;
   wherein the control unit is operatively configured such that:
   in a first display operating state, a first vehicle-related information item and a first graphics object, which represents the motor vehicle, are displayed;
   in a second display operating state, a second vehicle-related information item and a second graphics object are displayed, which second graphics object represents the motor vehicle in the same manner as the first graphics object and at a smaller size than the first graphics object, and
   switching between the first display operating state and the second display operating state occurs via an operator control action detected by the operator control device, and
   the first and second vehicle-related information items are displayed on the display unit with corresponding component-graphics objects or area-graphics objects marked on the display unit at a location on or near their associated first or second graphics object representing the motor vehicle in a manner corresponding to the associated components or areas relative to a center of the motor vehicle.

2. The motor vehicle according to claim 1, wherein the second vehicle-related information item is associated with the area or the component outside or inside the motor vehicle at a greater distance from a center of the motor vehicle than the area or the component to which the first vehicle-related information item is associated.

3. The motor vehicle according to claim 1, wherein in an additional display operating state, a display scale of a road map display is changed via an operator control action detected by the operator control device.

4. The motor vehicle according to claim 1, wherein, in the second display operating state, an operator control action detected by the operator control device causes a switch-over into a zoom operating state wherein a display unit displays a road map display;
   and wherein a display scale of the road map display is changed via an additional operator control action detected by the operator control device.

5. The motor vehicle according to claim 1, wherein the first graphics object and the second graphics object are substantially identical other than with respect to a display size.

6. The motor vehicle according to claim 1, wherein the first graphics object and the second graphics object are substantially identical having at least one of an identical shape, identical contour and identical display position on the display unit.

7. The motor vehicle according to claim 1, wherein the operator control device comprises a rotary element rotatable about an axis, the operator control action comprising a rotation of the rotary element in a predefined direction of rotation.

8. The motor vehicle according to claim 7, wherein the operator control action comprises a rotation of the rotary element about a predefined angle of rotation in the predefined direction of rotation.

9. A motor vehicle, comprising:
   a display unit for displaying vehicle-related information items associated with at least one of areas and components located at least one of outside and inside the motor vehicle;
   an operator control device for detecting an operator control action; and
   a control unit, the control unit being operatively coupled with the display unit and the operator control device;
   wherein, the control unit is operatively configured such that:

consecutive identical operator control actions detected by the operator control device allow an operator to page through a variety of vehicle-related information items, said paging being coupled with a change in a display scale of a graphics object representing the motor vehicle and displayed on the display unit, the paging is coupled with a consecutive marking of component-graphics objects or area-graphics objects on the display unit, the component-graphics objects or the area-graphics objects corresponding to components or an area to which the displayed vehicle-related information item relates, and the location of the component-graphics objects or the area-graphics objects relative to the graphics object representing the motor vehicle corresponds to a location of the components or areas relative to a center of the motor vehicle.

10. A method for operating a motor vehicle having a display unit for displaying vehicle-related information items relating to at least one of areas and components located at least one of outside and inside the motor vehicle, an operator control device for detecting an operator control action, and a control unit operatively coupled with the display unit and the operator control device, the method comprising the acts of:

displaying, in a first display operating state, a first vehicle-related information item and a first graphics object, the first graphics object representing the motor vehicle;

displaying, in a second display operating state, a second vehicle-related information item and a second graphics object are displayed, the second graphics object representing the motor vehicle in the same manner as the first graphics object and at a smaller size than the first graphics object;

switching between the first display operating state and the second display operating state via a detected operator control action, and marking corresponding component-graphics objects or area-graphics objects on the display corresponding to areas or components to which the displayed vehicle-related information items relate a location of the component-graphics objects or the area graphics objects relative to the graphics object representing the motor vehicle corresponding to a location of the components or areas relative to a center of the motor vehicle.

11. The method according to claim 10, wherein the second vehicle-related information item relates to an area or a component outside or inside the motor vehicle that is at a greater distance from a center of the motor vehicle than the area or the component to which the first vehicle-related information item relates.

12. The method according to claim 11, further comprising the acts of:

displaying, in an additional operating state, a road map at a certain display scale; and changing the display scale of the road map via an additional detected operator control action.

13. The method according to claim 12, further comprising the acts of:

in the second display operating state, switching-over into a zoom operating state via an additional detected operator control action, the zoom operating state displaying a road map at a certain display scale; and changing the display scale of the road map via a further detected operator control action.

* * * * *